United States Patent [19]
Buch-Rasmussen et al.

[11] Patent Number: 5,945,187
[45] Date of Patent: Aug. 31, 1999

[54] MEDICAMENT CONTAINER OF POLYMER OF LINEAR OLEFIN FOR STORING A LIQUID MEDICAMENT

[75] Inventors: Thomas Buch-Rasmussen, Gentofte; Patric Jannasch, Roskilde; Erling Bonne Jørgensen, Veksø, all of Denmark

[73] Assignee: Novo Nordisk A/S, Bagsvaerd, Denmark

[21] Appl. No.: 08/991,518

[22] Filed: Dec. 16, 1997

[30] Foreign Application Priority Data

Dec. 23, 1996 [DK] Denmark .................................. 1498/96

[51] Int. Cl.⁶ ...................................................... C08L 23/00
[52] U.S. Cl. .................... 428/36.92; 428/35.7; 206/524.4
[58] Field of Search ................................ 428/35.7, 36.92; 26/524.4

[56] References Cited

FOREIGN PATENT DOCUMENTS

| | | |
|---|---|---|
| 0 564 206 | 10/1993 | European Pat. Off. . |
| 0 622 410 | 11/1994 | European Pat. Off. . |
| 58112546 | 7/1983 | Japan . |
| 08131515 | 7/1994 | Japan . |
| 09099036 | 5/1995 | Japan . |
| 09099037 | 5/1995 | Japan . |
| 10025319 | 1/1998 | Japan . |

OTHER PUBLICATIONS

McCsrthy, T. J., Pharm. weekblad, 107, pp. 1–7, (1972).

Tarr et al., American Journal of Hosp. Phar., 48, pp. 2631–2634, (1991).

*Primary Examiner*—Charles Nold
*Attorney, Agent, or Firm*—Steve T. Zelson, Esq.

[57] ABSTRACT

A medicaments, container for storing a liquid medicament comprising one or more active medicaments, water and at least one preservative has a preferably cylindrical wall defining an interior space for such liquid medicament. The wall includes at least two opposed portions composed of a polymer material with a thickness of between 0.3 mm and 3 mm, a light transmission at 400 nm of 25% or more measured through the opposed container wall portions when the container is filled with water, using a standard spectrophotometer and air as reference. The polymer wall portions are of a material comprising at least 70% by weight of a linear optionally branched polyolefin material, the olefin monomer being selected from ethylene, propylene, butylene or a mixture thereof The polyolefin material has a crystallinity above 35% by weight, measured by differential scanning calorimetry, by cutting pieces from the container walls and heating them in an aluminum pan from 10° C. to 270° C. at the scanning rate of 10° C./min, recording and integrating the melting endotherms, and using the value of 209 J/g for 100% crystalline polypropylene as a reference.

19 Claims, No Drawings

MEDICAMENT CONTAINER OF POLYMER OF LINEAR OLEFIN FOR STORING A LIQUID MEDICAMENT

CROSS-REFERENCE TO RELATED APPLICATIONS

This application claims priority under 35 U.S.C. 119 of Danish application serial no. DK 1498/96 filed Dec. 23, 1996, the contents of which are fully incorporated herein by reference.

The present invention relates to a medicament container for storing a liquid medicament, use of such medicament container, and a medicament container at least partly filled with medicament.

Traditionally, medicament containers for storing liquid medicaments and preparations have been made of glass. For certain medicaments, such as medicaments for peroral administration, containers of opaque polyethylenes or polyesters have also been used. Such a polymer container made of a polyglycolic acid polyester and a terephthalic polyester is e.g. described in U.S. Pat. No. 4,565,851. This container provides a very good barrier against oxygen and other gasses, but it does not provide a sufficient barrier against preservatives and water.

Medicaments, such as insulin or growth hormone, are distributed in small containers or ampoules. Such ampoules normally comprise between 1.5 and 10 ml of ready-to-use medicament. These ampoules are stored in stock, at the hospitals or pharmacies, and with the user. This means that the shelf-life must be sufficiently long. Aqueous solutions or suspensions of medicaments, such as insulin or growth hormones, are normally provided with a preservative, such as phenol and/or benzyl alcohol and/or m-cresol. Addition of preservatives is necessary because a terminal sterilisation is not possible due to the sensitivity of medicaments containing proteins, peptides and/or DNA sequences. Medicaments in containers comprising more than one dose, e.g. for use in pen systems, are at a high risk of contamination. Therefore, preservatives are essential ingredients in such medicaments, in particular in medicaments for parenteral administration. Phenol, benzyl alcohol and m-cresol are approved in small amounts for use in parenteral medicaments, e.g. for intramuscular administration. Aqueous solutions or suspensions of medicaments comprising a preservative may be stored in glass containers for up to 2 years.

The article "Interaction between aqueous preservative solutions and their plastic containers, III" by T. J.McCarthy, Pharm. Weekblad 107 (1972), describes the effects storing certain aqueous solutions of preservatives in containers of polypropylene (PP) coloured with white pearl pigment and poly(vinylchloride) (PVC), respectively, in particular with respect to the loss of preservatives from the solutions. There were no discussions about storing aqueous solutions of preservatives in transparent containers. Further, the conclusion in this article is that large amounts of some types of preservatives are lost from the solutions stored in PP. PVC, however, seems to provide a good barrier against preservatives. As a consequence of its chlorine content, PVC is not acceptable for use due to environmental pollution.

Tarr et al., "Stability and sterility of biosynthetic human insulin stored in plastic insulin syringe for 28 days", American Society of Hospital Pharmacists, vol. 48, pages 2631–34, 1991, describes a similar test of storing aqueous solutions of phenol, benzyl alcohol and m-cresol, respectively, in polypropylene-polyethylene syringes, in particular with respect to the loss of phenol, benzyl alcohol and m-cresol, respectively, from the solutions.

The test covers only 28 days, but from this test it is concluded that the polypropylene-polyethylene syringes cannot be used for storing medicaments comprising phenol and/or benzyl alcohol and/or m-cresol. Insulin or growth hormone containing ampoules are normally stored at refrigerator temperature about 5° C. when stored in stock or at hospitals or pharmacies. When stored with the user, they are often stored at room temperature for up to one month. In particular insulin is stored at room temperature, because the user normally has to carry insulin with him or her all the time. The concentration of insulin and preservative must be close to constant within the storage period. If the concentration of preservative is too low, the medicament will not be sufficiently preserved. It could be suggested to prepare the medicament with a higher initial concentration of preservative. This would, however, not be acceptable for parenteral use. The loss of water should also be very low during the time of storage, because losing a too large amount of water would result in a too high concentration of active medicament, and possibly a too high concentration of preservatives. If too much water is lost, the user may get an overdose of the active medicament, such as insulin.

Further, it is important that the user can visually inspect the medicament to make sure that the medicament is not crystallised or polymerised due to e.g. self association or denaturation, or that any other visually detectable change of the medicament has occurred, such as oxidation of the active medicament.

The object of the present invention is to provide a medicament container of a polymer material, which material is substantially inert to the medicament, and which container is transparent and provides a good barrier against m-cresol/phenol/benzyl alcohol and water, respectively.

Another object of the invention is to provide a medicament container, which is cheap and easy to produce.

Yet another object of the invention is to provide a medicament container for long-time storage of aqueous medicaments, such as aqueous solutions of insulin or human growth hormone.

The medicament containers according to the present invention for storing a liquid medicament comprising one or more active medicaments, water and m-cresol and/or phenol and/or benzyl alcohol, comprises a distal and a proximal end portion and a wall, at least two portions of the wall being of a polymer material. These polymer wall portions have a thickness of between 0.3 mm and 3 mm, preferably between 0.5 mm and 1 mm, a light transmission at 400 nm of 25% or more, measured through both of the opposite container wall portions when the container is filled with water, using a standard spectrophotometer and air as reference, and the polymer wall portions being of a material comprising at least 70% by weight of a linear optionally branched polyolefin material, the olefin monomer being selected from ethylene, propylene, butylene or a mixture thereof, the material having a crystallinity above 35%, preferably above 37% by weight, measured by differential scanning calorimetry, by cutting pieces from the container walls and heating them in an aluminium pan from 10° C. to 270° C. at a scanning rate of 10° C./min, recording and integrating the melting endotherms, and using the value of 209 J/g for 100 crystalline polypropylene as a reference.

The material may comprise up to 5% by weight of additives in particular selected from antioxidants, lubricants such as stearates and silicones, surface active agents, nucleating and clarifying agents, and up to 30% by weight of inert fillers, such as glass particles having a refractive index about equal to the refractive index of the polymer material, the total amount of additives and fillers being up to 30% by weight.

As explained above, the scattering and absorbence of visible light of the material must be low in order to control the quality of the medicament in the container. Quality control can be a visual inspection for foreign particles, homogeneity of a suspension, sedimentation of crystals, precipitation in solutions, fibrillation or polymerisation of peptides or proteins in solutions, and changes in the absorbance spectrum of the medicament solution.

Most critical are changes which affect the concentration of the active medicament or drug in the solution, and of these, a polymerisation or a precipitation can be very difficult for a user to observe, especially if the container has a low light transmission.

For some insulin formulations, it is important that a diabetic patient can visually observe if more than 3% of the insulin are polymerised. The polymerised insulin can visually and with a spectrophotometer be observed as a change in light transmission. The typical change in transmission from an insulin solution where 3% of the insulin are polymerised, corresponds to the transmission change in a 1:400 Ph.Eur standard and a typical change in transmission from an insulin solution where 30% of the insulin are polymerised, corresponds to the transmission change in 1:40 Ph.Eur standard. (1997 European Pharmacopeia section 2.2 Physical and Physicochemical Methods. 2.2.1 Clearity and Degree of Opalescence of Liquids.)

In a glass container, the transmission typically changes from about 94% to about 45% with a 1:40 Ph Eur at 400 nm and 0.9 mm wall thickness. In an amorphous cyclic polyolefin, the transmission typically changes from about 85% to about 41% with a 1:40 Ph.Eur, changes visually perceivable by eye. In highly transparent polypropylene, the transmission typically changes from about 40% to about 18%. In a less transparent polypropylene, the transmission typically changes from about 15% to about 6%, or even from about 4% to about 3%, all changes being determined using a 1:40 Ph.Eur.

It is obvious that the patient has the best possibility of observing such a problem in a medicament container where the transmission is high, and where the changes are large. In practice, the transmission in a 3 ml container with a wall thickness of 0.9 mm and filled with a commercial insulin solution, such as Actrapid 100 U/ml (Novo Nordisk A/S), is recommended to be higher than 25% at 400 nm in order to be able to visually observe a polymerisation larger than 3%.

A few suitable materials for packaging parenteral drugs preserved with m-cresol have surprisingly been found among the group of polyolefin materials. As explained above, any material must fulfil a number of specifications to be able to prevent m-cresol and water from disappearing from the drug formulation, and to be able to allow visual inspection of the product quality.

Crystalline polymers often have a very low transmission at 400 nm, mainly because some of the crystals are larger than 400 nm and thus scatter the light. The size of the crystals is often decreased by addition of a nucleating agent to the polymer. Polymers sometimes have attained a slight yellowness after processing which influence the light transmission negatively in that light at 400 nm is absorbed, and therefore provides a decreased possibility of observing oxidation products in the drug of interest.

The medicament containers of the present invention should preferably meet the following requirements:

The polymer wall portions have a permeability of m-cresol of less than $0.0072$ $g/m^2/24$ hours, measured after a storing period of three months at 37° C. and 12% relative humidity (RH) by contacting the polymer wall with an aqueous 3 mg/ml m-cresol solution, and a permeability of water of less than $0.4$ $g/m^2/24$ hours, measured after a storing period of three months at 37° C. and 12% RH, more preferably the polymer wall portions have a permeability of m-cresol of less than $0.0070$ $g/^2/124$ hours, more preferably less than $0.0055$ $g/m^2/124$ hours, and even more preferably less than $0.0045$ $g/m^2 124$ hours, measured after a storing period of three month at 37° C. and 12% RH by contacting the polymer wall with an aqueous 3 mg/ml m-cresol solution, and preferably the polymer wall portions have a permeability of water of less than $0.35$ $g/m^2/24$ hours, more preferably less than $0.30$ $g/m /24$ hours, and even more preferably less than $0.20$ $g/m^2/24$ hours, measured after a storing period of three months at 37° C. and 12% RH.

Preferably, the polymer wall portions have a permeability of water of less than $0.025$ $g/m^2/124$ hours, measured after a storing period of three months at 8° C. and 13% RH for 36 months, more preferably less than $0.021$ $g/m^2/124$ hours.

M-cresol, benzyl alcohol and phenol are all organic solvents with very low solubility in water. M-cresol is less polar than phenol and benzyl alcohol and will therefore diffuse faster than phenol and benzyl alcohol in a hydrophobic environment, such as a polyolefin matrix. Further, the solubility of m-cresol will be higher in a hydrophobic environment such as a polypropylene polymer. Even though phenol and benzyl alcohol are smaller molecules than m-cresol and that the size can be important for the diffusion rate, we have found that the loss of phenol or benzyl alcohol rate will be smaller than the loss of m-cresol, and it is therefore sufficient to determine the loss of m-cresol.

According the present invention it is even more preferred that the medicament container, in particular for parenteral drug applications, meet the following requirements:

The transmission should preferably be higher than 30% at 400 nm, and even more preferably higher than 50% at 400 nm.

The loss of water should be less than 1,5% after storage at 37° C. and 12% RH for 3 months and less than 1% after storage at 8° C. and 13% RH for 36 months. For a 3 ml container with an inner diameter of 9,25 mm and a wall thickness of 0.9 mm this corresponds to a permeability at 37° C. of about $0,35$ $g/m^2/124$ hours and at 8° C. of about $0,021$ $g/m^2/24$ hours.

The loss of m-cresol should be less than 10% for the whole container, and preferably 7,5% for the polymer wall portions of the container after storage at 37° C. and 12% RH for 3 months. For a 3 ml container with an inner diameter of 9,25 mm and a wall thickness of 0.9 mm, this corresponds to a permeability of about $0,0053 g/m^2/24$ hours.

According to the invention, a group of polymer containers have been found to meet the specification, namely the containers comprising crystalline polymers of a linear optionally branched polyolefin material, the olefin monomer being selected from ethylene, propylene, butylene or a mixture thereof, the material having a crystallinity above 35% by weight, such as above 37% by weight, measured by differential scanning calorimetry, by cutting pieces from the container walls and heating them in an aluminium pan from 10° C. to 270° C. at a scanning rate of 10° C./min, recording and integrating the melting endotherms, and using the value of 209 J/g for 100% crystalline polypropylene as a reference.

The crystalline polymer is preferably a linear or branched polypropylene or a linear or branched polyethylene, more preferably selected from a polypropylene homopolymer or a propylene ethylene copolymer or a blend thereof. The content of ethylene in the propylene ethylene copolymer is preferably up to 1.8% by weight, more preferably between 0.5 and 1.8% by weight, and even more preferably between 1% and 1.8% by weight of the total polymer wall material.

The ethylene content was measured using a FTIR spectophotometer at 730 cm$^{-1}$, and using the propylene absorbance at 460 cm$^{-1}$ as internal reference, preferably between 0.5 and 1.8% by weight, more preferably between 1% and 1.8% by weight of the total polymer wall material.

Too low ethylene content will in general result in a high crystalline polyolefin material with large crystals, yielding a material with too low light transmission at 400 nm. However, polyolefins produced by use of metallocene catalyst technology can be branched in such a way that crystallinity and the size of crystals are controlled so as to optimize the transparency of the material. An effect on crystallinity similar to the effect obtained by ethylene in a polypropylene, can thereby be achieved with the use of metallocene catalyst polymerisation of propylene with or without other olefin monomers.

Too much ethylene in the material will in general result in a lower crystallinity, and thus in poor barrier properties.

The crystallinity of the polymer wall material should preferably be up to 50%, more preferably up to 45%, and even more preferably up to 42% by weight, measured as specified above.

Further, it is preferred that the crystalline polymer wall portions have a light transmission higher than 30% at 400 nm.

In general, crystals are expected to be distributed randomly in the polymer bulk. However, moulding condition can affect the crystallisation process and result in an asymmetrical distribution of the crystals. The surface concentration of crystals can theoretically be higher than the bulk, and actually a 200 nm high crystalline layer can be the diffusion rate limiting step in the process, and such a layer will not affect the transparency of the material. According to the present invention, the medicament containers are preferably produced using injection moulding technique.

The density of a plastic material depends on the density of the crystal phase and the density of the amorphous phase. In general, the permeability rate is negligible in the crystals as compared with the amorphous phase. The density of the crystalline phase i.a. depends on the material, the additives, but also on the processing conditions. The density of the amorphous phase, i.a. depends on the free volume in this amorphous phase and on the glass transition temperature. Thus, it could be expected that the density of the amorphous phase of the crystalline polymer materials was important for the barrier effect. However, the density is not important for the barrier effect of the crystalline polymer materials.

It is preferred that the crystalline polymer material of the container wall portions preferably has a glass transition temperature of at least −20° C., and more preferably at least −15° C., and even more preferably at least −10° C.

The remainder of the material may preferably be up to 5% by weight of additives, in particular selected from antioxidants, lubricants, such as stearates and silicones, surface active agents, nucleating and clarifying agents, and inert fillers, such as glass particles having a refractive index about equal to the refractive index of the polymer material, the total amount of additives and fillers being up to 30% by weight.

The container according to the invention having polymer wall portions of crystalline material may have any suitable shape. It is preferred that the inner surface of the wall, and preferably also the outer surface of the wall of the container, has a substantially cylindrical shape, because if a flexible rubber piston is rotated a few degrees in the container, it can only keep its tightening effect if at least the inner surface of the container has a substantially cylindrical shape.

The container may preferably be a cartridge, the distal end portion comprising a pierceable seal, and the proximal end portion comprising a plunger. Such cartridges are known in the art.

The polymer wall portions preferably constitute at least 30%, preferably more than 50%, and more preferably more than 80% of the area of the wall.

The container may have thicker and thinner wall parts. An improved transmission may be obtained by decreasing the thickness of one or more parts of the container wall. This will obviously affect the barrier properties in these parts. Improved barrier properties of the container may be obtained by increasing the thickness of one or more parts of the container wall.

In a preferred embodiment according to the invention, the container is a cartridge having a polymer wall with a cylindrical inner side, and a distal end portion comprising a pierceable seal, and a proximal end portion comprising a plunger, the wall having a varying thickness so as to provide a very transparent window.

The wall of the container may preferably be made by injection moulding, in particular if the main part or all of the wall is made from polymer material.

The invention also relates to the use of the containers for storing a medicament comprising one or more preservatives. The medicament is preferably an aqueous solution or suspension of human growth hormones, or an aqueous insulin solution or insulin suspension, preferably comprising between 25 and 600 U of insulin, between 0.1 and 5 mg of phenol or benzyl alcohol, and between 0.5 and 5 mg of m-cresol per ml medicament.

In the examples, the following methods of determining the properties of the materials have been used:

Permeability

The materials were moulded into 3 ml containers with an outer diameter of 11.05 mm, an inner diameter of 9.25 mm, and thus a wall thickness of 0.90 mm. The containers were closed with a bromobutyl rubber stopper in one end and a bromobutyl/natural rubber laminate in the other end.

The permeability of m-cresol was measured after storage of the container with insulin (Actrapid, 100 IU/ml, Novo Nordisk A/S) at 37° C., 13% RH for 3 months.

The permeability of water was measured after storage of the container with insulin formulation (Actrapid, 100 IU/ml, Novo Nordisk A/S) at 37° C., 13% RH for 3 months and at 8° C., 13% RH for 6, 12 and 18 months.

M-cresol permeability

The m-cresol loss was measured after a storing period of three month at 37° C., with a HPLC size-exclusion method using isocratic elution with a mobile phase, on a Waters Protein-Pak I-125 column, with the following composition: 600 g of glacial acetic acid, 600 g of acetonitrile, 2,8 g of L-arginine and water added to 4000 g. Frozen standards were used to correct for drift in the HPLC system. Glass containers with the same dimensions as the plastic containers were used to correct for losses through the rubber stopper and the rubber closure. The permeability was calculated.

Water permeability

The water permeability was measured as a weight loss after the test period of 3, 6 and 18 months. The loss was linear with time in the test period and the results can therefore be extrapolated to 36 months at 8° C. Glass containers with the same dimensions were used as reference.

Transmission

The transmission was measured with a standard spectrophotometer, using air as reference. The container was placed with the light beam perpendicularly to the plastic surface, so that the light beam passed through the container wall, through the water solution or water contained therein, and out through the opposite container wall into the detector. In this setup, the light passes through the double wall thickness. The diameter of the light beam was kept small, as compared with the diameter of the container, to avoid reflection on the container surface.

Density

The densities of the plastic materials were determined by measuring the volumetric change of an aqueous solution, containing a detergent, when adding a known weight of the plastic to the liquid.

Crystallinity

The weight percent of crystalline phase, i.e., the crystallinity, of the polypropylene materials was evaluated by differential scanning calorimetry, DSC. Samples were cut from the containers and put into aluminium pans. The samples were subsequently heated from 10° C. to 270° C. at a scanning rate of 10° C./min. The peaks recorded at the melting endotherms were integrated. The crystallinities were evaluated by comparing the values of the integrated peaks with a reference value of 209 J/g for 100% crystalline polypropylene.

Ethylene content

The ethylene content was measured using a FTIR spectophotometer at 730 $cm^{-1}$, and using the propylene absorbance at 460 $cm^{-1}$ as internal reference.

The method was calibrated by using two propylene copolymer samples with known ethylene content, and one containing no ethylene. If the polymer contain additives comprising 3-4 repeating methylene groups, these additives may be recognised as polymerized ethylene. However, normally this source of error can be neglected.

Materials

In the examples, the materials of table 1 were used.

TABLE 1

Materials used in 15 samples

| Polypropylenes: | Distributor | Development Sample (Yes/No) | Used in example No |
|---|---|---|---|
| Fina Pro PPH 10042GR | Fina, Denmark | YES | 1 |
| Fina PPH 9010 | Fina, Denmark | YES | 1 |
| Ferro NPP00 HQ3246NA-22 | Melitek ApS, DK | YES | 1 |
| Rexene © 41E12 | Melitek ApS, DK | NO | 1 |
| Rexene ® 23H10 | Melitek ApS, DK | NO | 1 |
| Rexene ® 13T10 | Melitek ApS, DK | NO | 1 |
| Borealis ® RF 3650 | Borealis, Denmark | YES | 1 |
| Borealis © XC20.76CN | Borealis, Denmark | YES | 1 |
| Borealis ® XB 80 | Borealis, Denmark | YES | 1 |
| Escorene ® PP1444 | Exxon, Denmark | NO | 1 |
| Escorene ® 9074H1 | Exxon, Denmark | NO | 1 |
| Hoechst Hostacan ® | Hoechst, Denmark | YES | 1 |
| Ferro NPP00 Q3296NA-22 | Melitek ApS, DK | YES | 2 + 3 |
| Ferro NPP00- NQ3296NA-25 | Melitek ApS, DK | YES | 2 |
| Ferro RS 2971-1 | Melitek ApS, DK | YES | 2 |
| Ferro RS 2071-2 | Melitek ApS, DK | YES | 2 |
| Ferro NPP00 NQ3246NA-P | Melitek ApS, DK | YES | 2 |
| Ferro NPP00 HQ3296NA-P2 | Melitek ApS, DK | YES | 2 |

The developmental materials from Melitek ApS, were developed on request from the inventors of the present invention in connection with the present invention. The other developmental materials were received from the companies as: not commercially available transparent materials, under development for later marked introduction. The developmental materials are therefore not commercially available as such, but may be obtained from the distributor on request.

EXAMPLE 1

Containers of 12 different, transparent polypropylene materials, see table I, were produced by injection moulding. The 3 ml containers all had outer diameters of 11,05 mm, inner diameters of 9,25 mm, and thus a wall thickness of 0.90 mm. The containers were closed with a bromobutyl rubber stopper in one end, and a bromobutyl/natural rubber laminate in the other end. The density, ethylene content, crystallinity, water and m-cresol permeability, and light transmission of the container samples were evaluated as described above. The results from the evaluation are shown in table 2.

As shown in table 2, the light transmission varies from 11.7 to 60.0%. The samples of Fina Pro 10042GR, Rexene® 41E12 and Rexene® 23M10 fail to meet the requirement of a minimum transmission of 25%.

The crystallinities of the container wall materials vary between 32 and 430. As described above, the permeability limits of water and m-cresol may, for example, be 0,35 $g/m^2$/day and 0,0053 $g/m^2$/day, respectively. As can be seen from the permeability data in table I, a degree of crystallinity above 37% is required if these preferred permeability limits are to be met. The 5 samples nos. 2, 3, 10, 11 and 12 according to the invention are marked with OK in the table.

TABLE 2

Both the m-cresol permeability and the water permeability data are obtained at 37° C. as described above.

| Wall material (sample No.) | Transmission | m-cresol permeability g/m²/day | Water permeability g/m²/day | Density g/ml | Ethylene content % | Crystallinity % | OK |
|---|---|---|---|---|---|---|---|
| Fina Pro PPH 10042GR (1) | 16.6 | 0.0045 | 0.25 | 0.90 | 0.1 | 43 | |
| Fina PPH 9010 (2) | 30.9 | 0.0035 | 0.25 | 0.91 | 0.2 | 42 | + |
| Ferro NPP00 HQ3246NA-22 (3) | 30.5 | 0.0042 | 0.23 | 0.90 | 1.6 | 39 | + |
| Rexene © 41E12 (4) | 17.9 | 0.0045 | 0.17 | 0.90 | 0.0 | 42 | |
| Rexene ® 23H10 (5) | 11.7 | 0.0049 | 0.30 | 0.89 | 2.1 | 33 | |
| Rexene ® 13T10 (6) | 46.2 | 0.0079 | 0.33 | 0.91 | 3.5 | 32 | |
| Borealis ® RF 3650 (7) | 29.9 | 0.0082 | 0.30 | 0.90 | 4.2 | 33 | |
| Borealis © XC20.76CN (8) | 47.3 | 0.0073 | 0.32 | 0.90 | 3.2 | 34 | |
| Borealis ® XB 80 (9) | 55.7 | 0.0077 | 0.29 | 0.91 | 2.6 | 35 | |
| Escorene ® PP1444 (10) | 26.0 | 0.0033 | 0.28 | 0.92 | 1.7 | 38 | + |
| Escorene ® 9074H1 (11) | 37.6 | 0.0069 | 0.22 | 0.90 | 1.8 | 37 | + |
| Hoechst Hostacan ® (12) | 60.0 | not measured | not measured | 0.90 | 0.2 | 39 | + |

The ethylene content has an influence on the degree of crystallinity and, as a consequence, also on the permeability.

The density varies within a very limited range, 0.89–0.92 g/cm². There is no correlation between the density and permeability data. Consequently, this parameter cannot be used when selecting a suitable material for a container in order to meet the permeability requirements.

EXAMPLE 2

The clarified polypropylene material from Ferro used for the container sample no. 3 in example 1 was used for further optimization of the compounds with regard to transmission and barrier properties. The process temperature and compound formulation were varied, and the properties of containers prepared of the resulting materials were evaluated as in example 1. The results are shown in table 3.

TABLE 3

Both the m-cresol permeability and the water permeability data are obtained at 37° C. as described above.

| Wall material (sample No.) | Transmission | m-cresol permeability g/m²/day | Water permeability g/m²/day | Density g/ml | Ethylene content % | Crystallinity % | OK |
|---|---|---|---|---|---|---|---|
| Ferro NPP00 Q3296NA-22 (13) | 30.5 | 0.0042 | 0.23 | 0.90 | 1.6 | 39 | + |
| Ferro NPP00-NQ3296NA-25 (14) | 19.2 | 0.0042 | 0.25 | 0.90 | 1.6 | 36 | |

TABLE 3-continued

Both the m-cresol permeability and the water permeability data are obtained at 37° C. as described above.

| Wall material (sample No.) | Transmission | m-cresol permeability g/m²/day | Water permeability g/m²/day | Density g/ml | Ethylene content % | Crystallinity % | OK |
| --- | --- | --- | --- | --- | --- | --- | --- |
| Ferro RS 2971-1 (15) | 26.3 | 0.0034 | 0.20 | 0.93 | 1.1 | 38 | + |
| Ferro RS 2071-2 (16) | 34.0 | 0.0038 | 0.21 | 0.91 | 1.3 | 41 | + |
| Ferro NPP00 NQ3246NA-P (17) | 33.0 | 0.0036 | 0.24 | 0.90 | 1.3 | 39 | + |
| Ferro NPP00 HQ3296NA-P2 (18) | 34.2 | 0.0038 | 0.25 | 0.92 | 1.0 | 30 | + |

The difference between the container sample no. 13 of Ferro NPPOONQ3246NA-22 and sample no. 14 of Ferro NPPOONQ3246NA-25, respectively, is the moulding temperature. Ferro NPPOONQ3246NA-25 was moulded at 250° C., which gave the container a slightly yellow colour, and therefore the absorption at 400 nm increases. This results in a decrease in the transmission as compared with sample no. 13, processed at 220° C. This example shows the importance of the process conditions, and not only of the compound itself, on the transmission.

The samples 15 to 18 are made of different compoundings of Ferro, all samples nos.13 and 15 to 18 have transmission and barrier properties within the specification of the invention and are therefore marked with "ok". This indicates that a further optimization of the transmission of the compounding (Ferro NPPOONQ3246NA-22) is possible within the specified limits of barrier properties.

EXAMPLE 3

The influence of the surface-to-volume ratio on the m-cresol permeability was studied in containers made of Ferro NPPOONQ3246NA-22 and closed with a bromobutyl rubber stopper in one end and a bromobutyl/natural rubber laminate in the other end.

The m-cresol loss was found to be 8.5% for the whole container, and 6% for the polypropylene part. The 6% correspond to a loss of 0.58 mg m-cresol per container (area 14.62 cm² and 3.22 ml volume), or a permeability of 0.0042 g/m²/day (0.9 mm thickness).

When increasing the surface-to-volume ratio from 4.5 cm²/ml to 5.7 cm²/ml, the m-cresol loss increases from 6% to 7.6%. Using another cylindrical container with a volume of 3 ml, where the height equals the diameter, the surface-to-volume ratio is 2.5 cm²/ml. Thus, the expected m-cresol loss should be 3.5%. In a 3 ml container, where the height equals the diameter, it would correspond to a diameter of 15.7 mm. The loss of m-cresol through the rubber stopper, and the rubber closure, would probably increase. For practical applications, the diameter of a 3 ml container should preferably be 7–12 mm, resulting in a loss between 4.5 and 7.6%.

The m-cresol loss is dependent on the m-cresol solubility in the polymer wall material, the diffusion through this material, and the adsorption at the wall surface. For Ferro NPPOONQ3246NA-22, the loss will decrease if the wall thickness increases. However, an increase in wall thickness will also decrease the light transmission, and thereby reduce the possibility of visual inspection of the drug.

The water loss was found to be 1.1% for the whole container (surface-to-volume ratio of 4.5 cm²/ml), and 1,0% for the polypropylene wall. The 1.0% corresponds to a loss of 32 mg water per container, or a permeability of 0.23 g/m²/day (0.9 mm thickness).

We claim:

1. A medicament container for storing a liquid medicament comprising one or more active medicaments, water and at least one preservative, the container comprising a distal and a proximal end portion and at least one wall defining an interior space for such liquid medicament, said at least one wall having at least two opposed portions composed of a polymer material, said polymer wall portions having a thickness of between 0.3 mm and 3 mm, a light transmission at 400 nm of 25% or more, measured through both of said opposed container wall portions when the container is filled with water, using a standard spectrophotometer and air as reference, the polymer wall portions being of a material comprising at least 70% by weight of a linear optionally branched polyolefin material, the olefin monomer being selected from ethylene, propylene, butylene or a mixture thereof, the material having a crystallinity above 35% by weight, measured by differential scanning calorimetry, by cutting pieces from the container walls and heating them in an aluminum pan from 10° C. to 270° C. at a scanning rate of 10° C./min, recording and integrating the melting endotherms, and using the value of 209 J/g for 100% crystalline polypropylene as a reference.

2. A container according to claim 1, wherein the polymer wall material comprises at least 75% by weight of a polyolefin material.

3. A container according to claim 1, wherein the polyolefin material is a linear or branched polypropylene or a linear or branched polyethylene.

4. A container according to claim 1, wherein the polyolefin material is a propylene ethylene copolymer having a content of ethylene of up to 1.8% by weight, measured using a FTIR spectrophotometer at 730 cm$^{-1}$, and using the propylene absorbance at 460 cm$^{-1}$ as internal reference.

5. A container according to claim 1, wherein the polymer wall material has a crystallinity of up to 50% measured as specified in claim 1.

6. A container according to claim 1, wherein the polymer wall portions have a light transmission at 400 nm of 30% measured as defined in claim 1.

7. A container according to claim 1, wherein the polymer wall material has a glass transition temperature of at least −20° C.

8. A container according to claim 1, wherein the polymer wall material comprises up to 5% by weight of additives selected from the group of antioxidants, lubricants, surface active agents, and nucleating and clarifying agents, and up to 30% by weight of glass particles having a refractive index about equal to the refractive index of the polymer material, the total amount of additives and glass particles being up to 30% by weight.

9. A container according to claim 1, wherein said at least one wall which forms said interior space has an inner surface having a substantially cylindrical shape.

10. A container according to claim 1, wherein said at least one wall which forms said interior space has an outer surface having a substantially cylindrical shape.

11. A container according to claim 1, wherein the container is a cartridge, the distal end portion comprising a pierceable seal and the proximal end portion comprising a plunger.

12. A container according to claim 1, wherein the polymer wall portions constitute at least 30% of the area of the at least one wall.

13. A container according to claim 1, wherein the polymer wall portions have a permeability of m-cresol of less than 0.0072 $g/m^2/24$ hours, measured after a storing period of three months at 37° C. and 12% RH by contacting the polymer wall with an aqueous 3 mg/ml m-cresol solution, and a permeability of water of less than 0.4 $g/m^2/24$ hours, measured after a storing period of three months at 37° C. and 12% RH.

14. A container according to claim 13, wherein the polymer wall portions have a permeability of m-cresol of less than 0.0070 $g/m^2/24$ hours, measured after a storing period of three months at 37° C. and 12% RH by contacting the polymer wall with an aqueous 3 mg/ml m-cresol solution.

15. A container according to claim 13, wherein the polymer wall portions have a permeability of water of less than 0.35 $g/m^2/124$ hours, measured after a storing period of three months at 37° C. and 12% RH.

16. A container according to claim 1, wherein the polymer wall portions have a permeability of water of less than 0.025 $g/m^2/24$ hours, measured after a storing period of 36 months at 8° C. and 13% RH.

17. A medicament container according to claim 1, at least partly filled with a liquid medicament solution, comprising one or more active medicaments, water and at least one preservative.

18. A medicament container according to claim 12, wherein the polymer wall portions constitute at least 50% of the area of the at least one wall.

19. A medicament container according to claim 12, wherein the polymer wall portions constitute at least 80% of the area of the at least one wall.

* * * * *

UNITED STATES PATENT AND TRADEMARK OFFICE
CERTIFICATE OF CORRECTION

PATENT NO.     :   5,945,187
DATED          :   August 31, 1999
INVENTOR(S)    :   Buch-Rasmussen et al.

It is certified that error appears in the above-identified patent and that said Letters Patent is hereby corrected as shown below:

Col. 14, line 12, claim 15: delete "124 hours", and insert --24 hours--

Signed and Sealed this

Twenty-fourth Day of October, 2000

*Attest:*

Q. TODD DICKINSON

*Attesting Officer*      *Director of Patents and Trademarks*